United States Patent
Casaccia et al.

(10) Patent No.: US 7,277,705 B2
(45) Date of Patent: Oct. 2, 2007

(54) METHOD, APPARATUS, AND SYSTEM FOR SELECTING A SERVICE PROVIDER SYSTEM

(75) Inventors: Lorenzo Casaccia, San Diego, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 10/329,310

(22) Filed: Dec. 23, 2002

(65) Prior Publication Data
US 2004/0192304 A1 Sep. 30, 2004

(51) Int. Cl.
*H04Q 7/20* (2006.01)
(52) U.S. Cl. .............. 455/435.1; 455/456.1; 455/432.1; 455/435.2; 455/434
(58) Field of Classification Search .......... 455/429, 455/432.1, 436, 437, 439, 446, 450, 451, 455/452.1, 452.2, 517, 435
See application file for complete search history.

(56) References Cited

U.S. PATENT DOCUMENTS

| | | | |
|---|---|---|---|
| 5,442,806 A * | 8/1995 | Barber et al. | 455/435.2 |
| 5,613,213 A * | 3/1997 | Naddell et al. | 455/435.2 |
| 5,734,980 A | 3/1998 | Hooper et al. | |
| 5,784,693 A | 7/1998 | Barber et al. | |
| 5,870,674 A | 2/1999 | English | |
| 5,983,115 A | 11/1999 | Mizikovsky | |
| 5,999,811 A | 12/1999 | Molne | |
| 6,009,328 A * | 12/1999 | Muszynski | 455/442 |
| 6,085,085 A * | 7/2000 | Blakeney et al. | 455/426.1 |
| 6,311,060 B1 * | 10/2001 | Evans et al. | 455/426.1 |
| 6,324,404 B1 * | 11/2001 | Dennison et al. | 455/456.1 |
| 6,415,148 B1 * | 7/2002 | Chiniga et al. | 455/434 |
| 6,487,408 B1 * | 11/2002 | Tokuyoshi | 455/435.1 |
| 2003/0050070 A1 * | 3/2003 | Mashinsky et al. | 455/452 |
| 2003/0148786 A1 * | 8/2003 | Cooper et al. | 455/552 |
| 2004/0110523 A1 * | 6/2004 | Ishii | 455/517 |
| 2004/0203745 A1 * | 10/2004 | Cooper | 455/432.1 |

FOREIGN PATENT DOCUMENTS

| | | |
|---|---|---|
| EP | 1175119 | 1/2002 |
| WO | 9507010 | 3/1995 |
| WO | 97385439 | 10/1997 |
| WO | 0163944 | 8/2001 |

OTHER PUBLICATIONS

"Digital cellular telecommunications system (Phase 2); Service accessibility (GSM 02.11); ETS 300 507" European Telecommunications Standards Institute (ETSI) Sep. 1996, XP014013525; vol. SMG1, Fourth Edition, p. 10-p. 13.
"Over -The-Air Service Provisioning of Mobile Stations in Spread Spectrum Systems, TIA/EIA/IS-683-A" TIA/EIA Interim Standard Jun. 1998, XP002133149, p. 75-p. 86.

* cited by examiner

*Primary Examiner*—Joseph Feild
*Assistant Examiner*—David Q. Nguyen
(74) *Attorney, Agent, or Firm*—Kam T. Tam; Dmitry Milikovsky; Thomas R. Rouse (57) ABSTRACT

A wireless communication device selects another service provider system when the MWCD has not changed its geographic position more than a threshold level.

11 Claims, 5 Drawing Sheets

| PREF_ONLY | DEF_ROAM_IND | NUM_EXT_ACQ_RECS | NUM_EXT_SYS_RECS |
|---|---|---|---|
| True | Flashing | 3 | 5 |

FIG. 1

| ACQ_INDEX | ACQ_TYPE | Description | Acquisition Parameters |
|---|---|---|---|
| 1 | '00000010' | Cellular CDMA-Standard Channels | System A, both Primary and Secondary |
| 2 | '00000010' | Cellular CDMA-Standard Channels | System B, both Primary and Secondary |
| 3 | '00001100' | Generic Acquisition Record for GSM | Band Class (900, 1900) |

FIG. 2

| SYS_REC_TYPE | SID | NID_INCL | PLMN_INCL | PLMN | PREF_NEG | GEO | PRI | ACQ_IND | ROAM_IND |
|---|---|---|---|---|---|---|---|---|---|
| '0000' IS-95 | 0 | 0 | N/A | N/A | 1 | 1 | 0 | 1 | Off |
| '0010' GSM | N/A | N/A | 0 | N/A | 1 | 0 | 1 | 3 | Off |
| '0000' IS-95 | 1 | 0 | N/A | N/A | 1 | 1 | 0 | 2 | Off |
| '0010' GSM | N/A | N/A | 1 | PLMN | 1 | 0 | 1 | 3 | Off |
| '0000' IS-95 | 2222 | 0 | N/A | N/A | 1 | 0 | 0 | 2 | Off |

METHOD, APPARATUS, AND SYSTEM FOR SELECTING A SERVICE PROVIDER SYSTEM

BACKGROUND

1. Field

The present invention relates generally to wireless communications, and more specifically selecting a service provider system in a geographic region.

2. Background

Wireless communication devices, such as cellular telephones, are commonly used as a replacement for conventional telephone systems. A large number of service providers compete for market share in multiple geographic regions. A user typically subscribes to a selected service provider and uses a wireless telephone device that is compatible with the service provider.

A user typically has a contractual obligation to the service provider wherein all billing for the wireless telephone is provided by the service provider. Users typically select service providers based on the financial arrangements of the contract and upon the areas of service coverage provided by the service provider. When the user operates the wireless telephone in a "home" region, service to the wireless telephone is typically provided by the user-selected service provider. When the user is outside the home region, the wireless telephone is said to be operating in a "Roam" mode. When operating in the Roam mode, the wireless telephone may be connected to the user-selected service provider, or some other service provider if the user-selected service provider cannot provide service to the wireless telephone. In either case, billing still occurs through the user-selected service provider. In the former situation, billing may be provided directly from the service provider. In the latter case, the billing from the actual service provider is forwarded to the user-selected service provider.

The wireless telephone is typically preprogrammed with the data related to various service provider systems taking into account the particular capabilities of the wireless telephone. For example, it is well known that wireless telephones can operate in either an analog mode or a digital mode, and in a cellular band or a personal communication system (PCS) band. Some wireless telephones are capable of operating in both the analog mode and the digital mode (although only one mode at a time), and some wireless telephones are capable of operating in both the cellular band and the PCS band. For a wireless telephone to communicate effectively, it must be within the operational boundaries of a wireless communication system service provider that supports the same mode and band with which the wireless telephone was designed to operate.

When first powered up, wireless telephones scan for a service provider whose system is compatible with the wireless telephone. A data table or other suitable structure, sometimes referred to as a "Roaming" list or a "Preferred Roaming List" (PRL), provides data related to all possible service providers for the particular wireless telephone. The wireless telephone uses the Roaming list in an attempt to acquire service in a particular geographic region.

For purposes of illustration, suppose a user of a wireless telephone travels from the geographic region of their particular "Home" service provider (e.g., the wireless service provider with whom the user contracted to provide wireless service) to another geographic region and therefore is operating in the Roam mode. Under these circumstances, the wireless telephone must detect and acquire a wireless service provider system. In any given geographic region, wireless service provider systems may comprise analog system service providers, commonly referred to as an advanced mobile phone service (AMPS) system, or a digital system, such as, by way of example, a code division multiple access (CDMA) system. Because the wireless telephone has no advanced knowledge of the user's present geographic location, the wireless telephone selects the service provider system based on one or more selection criteria.

When powered on, the wireless telephone scans for any suitable wireless service provider based on criteria, such as signal strength of the wireless service provider's system, the wireless telephone's mode of operation, the wireless telephone's band of operation, and on the particular channel availability. The wireless telephone selects the first service provider system that it encounters that meets the criteria for the particular wireless telephone.

Wireless telephones are now being equipped to handle a Global System for Mobile Communications (GSM) digital mode as well as CDMA digital mode and AMPS analog mode. The PRL, however, does not account for the addition of the GSM mode to the wireless telephone. Therefore, it can be appreciated that there is a need for an apparatus and method to account for the addition of the GSM mode, so that the tri-mode (AMPS, CDMA, and GSM) wireless telephone can effectively attempt to acquire service in a particular geographic region. The present invention provides this and other advantages as will be apparent from the following description and accompanying figures.

DETAILED DESCRIPTION

Figure 1:
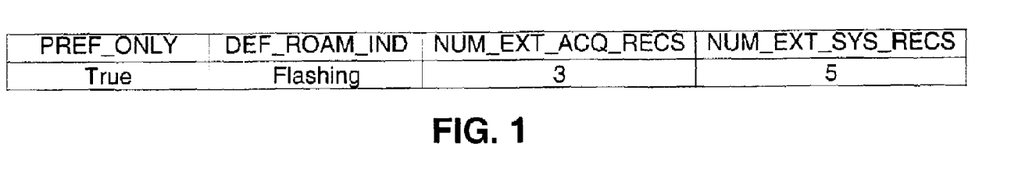
FIG. 1 illustrates the basic structure of an exemplary Extended Preferred Roaming List.

FIG. 1 illustrates the basic structure of an exemplary Extended Preferred Roaming List that indicates which service provider systems a wireless communication device, such as a wireless communication device, should use. The exemplary Extended Preferred Roaming List comprises fields PREF_ONLY, DEF_ROAM_IND, NUM_EXT_ACQ_RECS and NUM_EXT_SYS_RECS.

The PREF_ONLY (Preferred Only) field is set to "1" if the wireless communication device is to operate only on systems that are specified in the Extended System Table (described below) with PREF_NEG set to "1." This field is set to "0" if the wireless communication device is to operate on systems that are specified in the Extended System Table with PREF_NEG set to "1" or on systems that are not specified in the Extended System Table.

The field DEF_ROAM_IND (Default Roaming Indication) is set to the roaming indication value the wireless communication device is to use when operating on systems not specified in the Extended System Table.

The value in the field NUM_EXT_ACQ_RECS defines the number of records in the Extended Acquisition Table.

The value in the field NUM_EXT_SYS_RECS defines the number of records in the Extended System Table.

Figure 2:
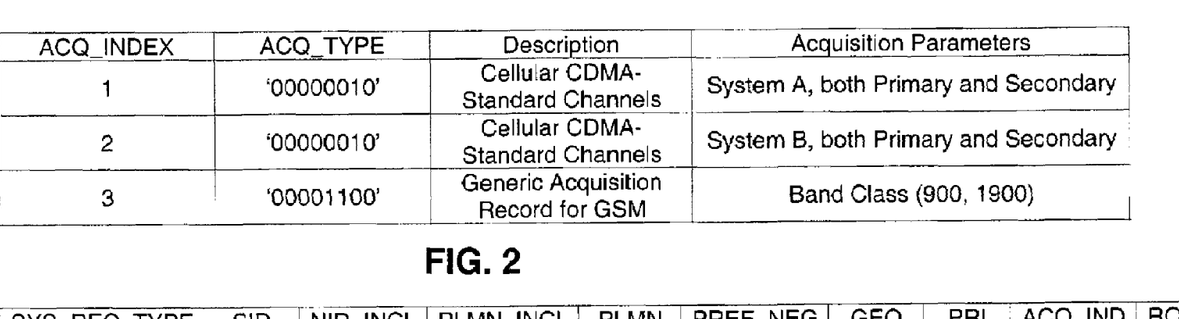
FIG. 2 illustrates an exemplary Extended Acquisition Table of the Extended Preferred Roaming List.

FIG. 2 illustrates an exemplary Extended Acquisition Table of the Extended Preferred Roaming List. The records in the Extended Acquisition Table provide the mode, band, and frequencies that the wireless communication device should use when attempting to acquire a service type. The records in the Extended Acquisition Table are in order of priority (highest priority first) according to desired scan order.

The Extended Acquisition Table comprises fields ACQ_INDEX, ACQ_TYPE, Description, and Acquisition Parameters.

The Description field comprises a plurality of service types for scanning for service. For example, in the exemplary Description field, contains two cellular CDMA standard channels and one generic acquisition record for GSM. Other service types can also be accommodated, for example, personal communications services (PCS) CDMA, cellular CDMA custom channels, cellular analog, and High-Data Rate (HDR) CDMA. The plurality of service types is ordered according to a desired scanning priority. For a wireless communication device equipped with GSM mode and CDMA mode, the plurality of service types can include at least one CDMA service type and at least one Global GSM service type in the Description field.

The Acquisition Parameters field can comprise the System A provider and the System B provider for cellular CDMA service type—Standard Channels, and their associated primary channels and secondary channels. The Acquisition Parameters field can also comprise the band classes for a GSM service type. In this example, the band classes are 900 megahertz and 1900 megahertz. Other acquisition parameters can also be accommodated; for example, PCS CDMA using channels may have acquisition parameters of 100, 125, 150, 175, and 200. PCS CDMA using blocks may have acquisition parameters of Block A, B, and C. Cellular CDMA custom channels may have acquisition parameters of channel number 1. Cellular analog may have acquisition parameters of System A and System B.

The ACQ_TYPE field (Acquisition Record Type) is set to the Extended Acquisition Record type and identifies the type-specific fields. For example, there is a value to indicate Analog, there is a value to indicate PCS CDMA, and a value to indicate CDMA in the Japanese Band.

The ACQ_INDEX field comprises a plurality of acquisition indices. Each acquisition index corresponds to one service type. For example, ACQ_INDEX equals one correspond to cellular CDMA System A, and ACQ_INDEX equals three corresponds to GSM service type having band classes 900 and 1900.

For the Extended Acquisition Table of FIG. 2, the wireless communication device will first attempt to acquire the service type corresponding to ACQ_INDEX=1. If the first service type cannot be acquired, the wireless communication device will then attempt to acquire the service type corresponding to ACQ_INDEX=2. This process continues until a service type is successfully acquired.

Figure 3:
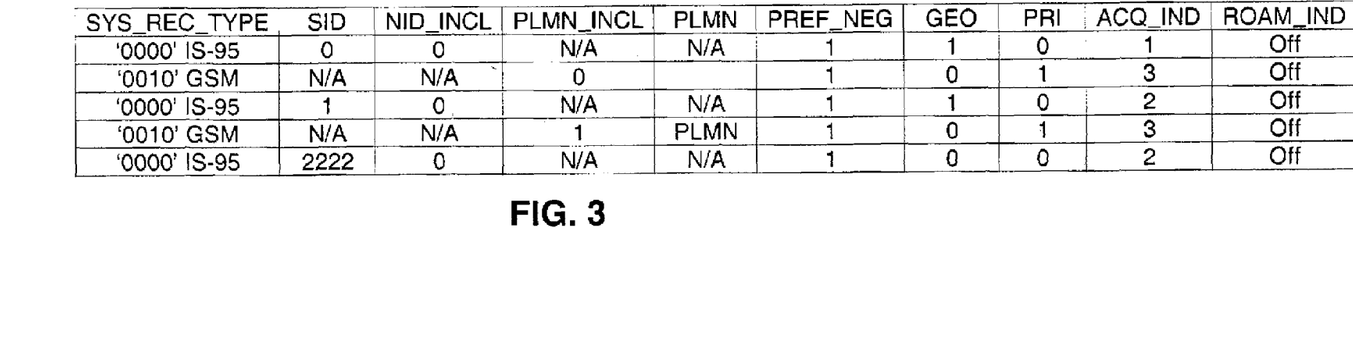
FIG. 3 illustrates an exemplary Extended System Table of the Extended Preferred Roaming List.

FIG. 3 illustrates an exemplary Extended System Table of the Extended Preferred Roaming List. The Extended System Table comprises records. Each record corresponds to a service provider system. CDMA service provider systems are identified by a system identifier (SID) and a network identifier (NID). GSM service types do not have corresponding SIDs and NIDs.

The Extended System Table comprises a plurality of service provider systems. The service provider systems are grouped by geographic regions. For example, in FIG. 3, the first two records is one geographic region having a cellular CDMA service provider system identified by SID=0 and a GSM service provider system. Because GSM does not have corresponding identifiers, the corresponding SID field is set equal to N/A.

Geographic regions are identified by the field GEO. A new geographic region occurs when the field is set to "1" and continues thereafter for subsequent fields set to "0." For example, the first two records of the Extended System Table shown in FIG. 3 is a first region; and the third, fourth, and fifth records is a second geographic region.

The grouped service provider systems are ordered according to a preference of service provider systems within a corresponding geographic region and to a preference of service type of each service provider system within the corresponding geographic region. In FIG. 3, the service provider systems that appear before other service provider systems in the same geographic region have higher priority over the other service provider systems. In this example, the cellular CDMA service provider system identified by SID=0 is preferred over the GSM service provider system in the first geographic region.

The Extended System Table comprises an ACQ_INDEX field. This field identifies the service types of the service provider systems. For example, the service provider system identified by SID=0 is a System A cellular CDMA-Standard Channel service type as indicated by ACQ_INDEX=1, and the GSM service type of the first geographic region is a GSM service type as indicated by ACQ_INDEX=3. One of ordinary skill in the art will appreciate that each service provider system can be assigned one or more service types indicating the service types of the service provider system in a particular geographic region. For example, the service provider system identified by SID=0 can also provide another service type in the first geographic region, for example a cellular analog service type identified by ACQ_INDEX=4 (not shown).

The ACQ_INDEX can be used to indicate a record in the Extended Acquisition Table to be used for acquisition.

Figure 4:
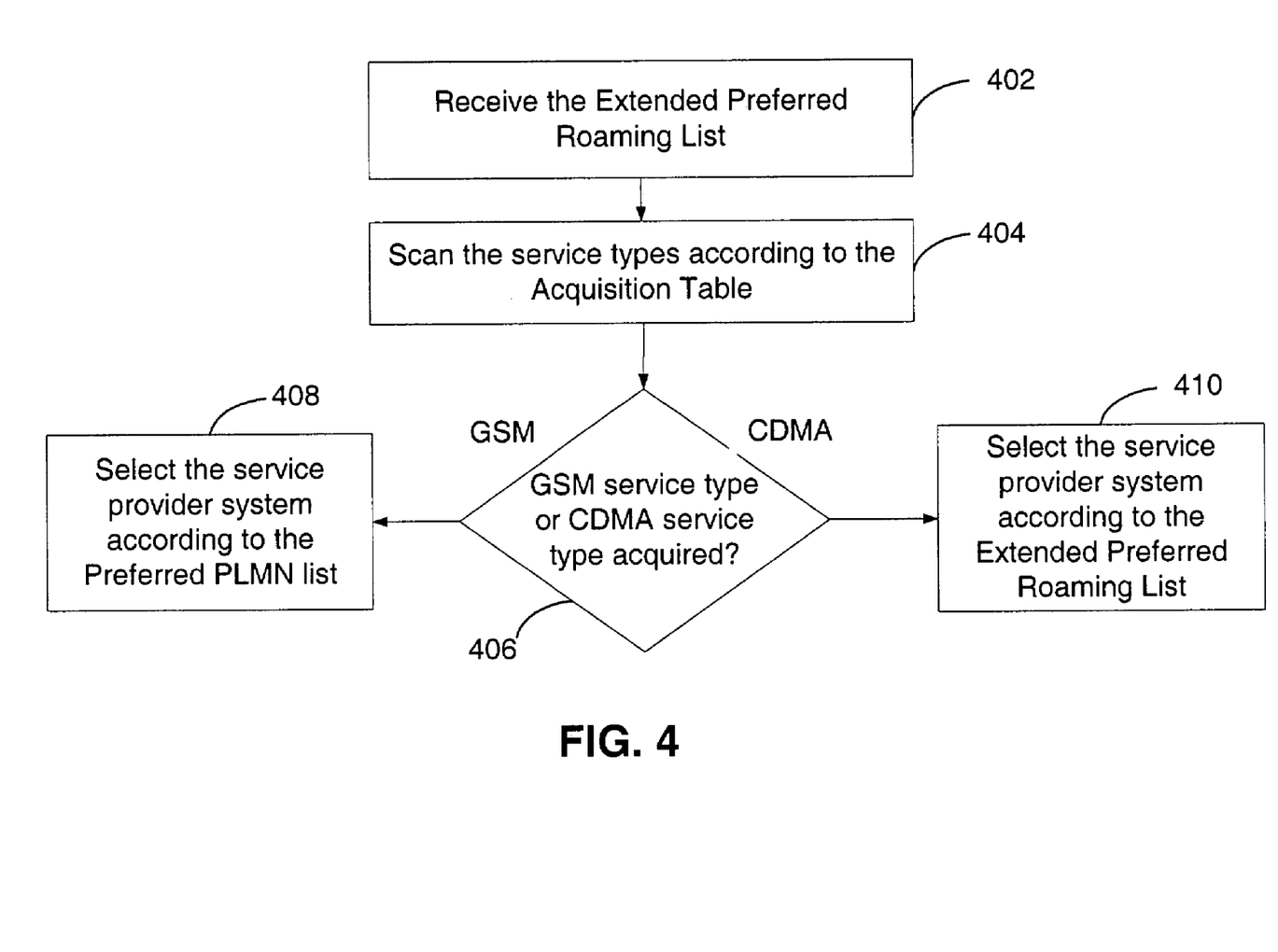
FIG. 4 illustrates a method of selecting a service provider system.

FIG. 4 illustrates a method of selecting a service provider system.

At 402, the wireless communication device can receive from a base station, over a CDMA service type, the Extended Preferred Roaming List comprising the Extended Acquisition Table and the Extended System Table. The Extended Roaming List can be stored in a memory of the wireless communication device. At 404, the wireless communication device can scan the service types according to the desired scanning priority contained in the Extended Acquisition Table, and acquire acquiring one of the service types.

At 406, the wireless communication device can determine whether a GSM service type or a CDMA service type is acquired. When a GSM service type is acquired, the wireless communication device can select the service provider system according to a Preferred PLMN list stored in a Subscriber Identity Module (SIM) card associated with the wireless communication device, at 408. The techniques for employing the GSM Preferred PLMN list is well known in the art.

When a GSM service type is acquired, the wireless communication device can select the service provider system according to the Extended Preferred Roaming List.

Figure 5:
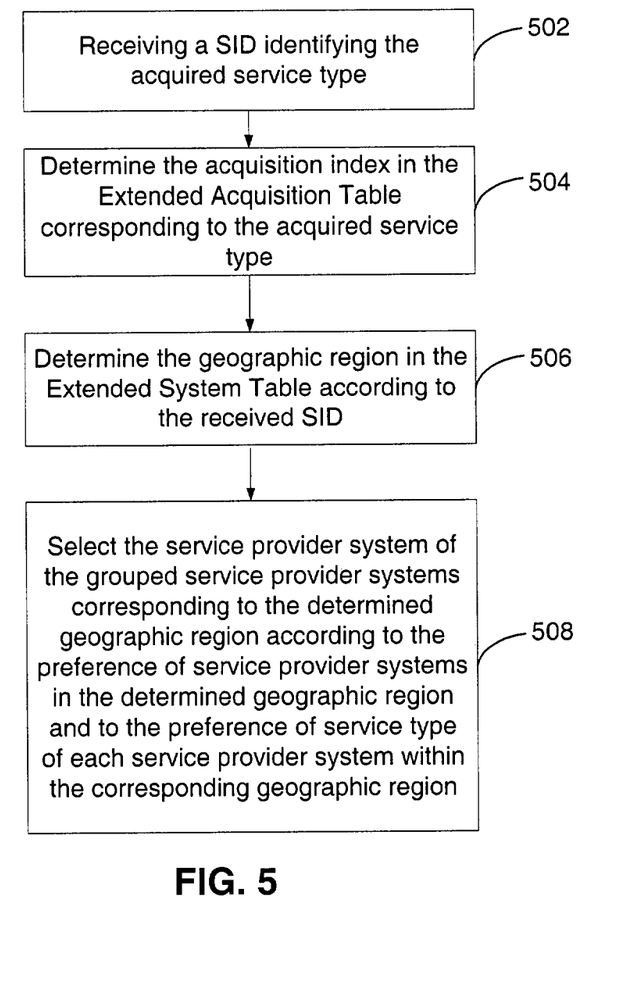
FIG. 5 illustrates a method of selecting a service provider system according to the Extended Preferred Roaming List.

FIG. 5 illustrates a method of selecting a service provider system according to the Extended Preferred Roaming List.

AT 502, when a CDMA service type is acquired, the wireless communication device can receive a SID identifying the service provider system of the acquired service type from the acquired CDMA service type. The SID is typically transmitted by a base station serving the geographic area that the wireless communication device is occupying. For example, the received SID can equal "0."

AT 504, the wireless communication device can determine the acquisition index in the Extended Acquisition Table corresponding to the acquired service type. For example, when the wireless communication device scans the service types in FIG. 2, the wireless communication device may acquire the first listed service type, that is Cellular CDMA-Standard Channels, System A, Primary and Secondary. The corresponding ACQ_INDEX is "1."

At 506, the wireless communication device can determine the geographic region in the Extended System Table according to the received SID. For example, for SID=0, the corresponding geographic region would be the first geographic region containing SID=0.

At 508, the wireless communication device can select the preferred service provider system of determined geographic region. For the above example with SID=0, the preferred service provider is the first listed service provider in the geographic region, namely, SID=0. The determined SID from the Extended System Table can be used in the Extended Acquisition Table to select the service type for acquisition and registration. In the above example, SID=0 corresponds to ACQ_INDEX=1, which corresponds to Cellular CDMA-Standard Channels, System A, Primary and Secondary.

In another example, SID=2222 can be acquired at 404. SID=2222 is in the second geographic region of the Extended System Table shown in FIG. 3. The preferred service provider system in the second geographic region is SID=1. SID=1 corresponds to ACQ_INDEX=2, which corresponds to Cellular CDMA-Standard Channels, System B, Primary and Secondary.

The Extended System Table can also include a public line mobile network (PLMN) inclusion indicator PLMN_INCL. Each GSM service type service provider system can be assigned a corresponding PLMN inclusion indicator indicating either a preference for order of selection of GSM service types within a corresponding geographic region or no preference for order of selection of GSM service types within the corresponding geographic region.

For example, when the PLMN_INCL indicates the preference for order of selection of GSM service types within the corresponding geographic region, for example PLMN_INCL=1, the GSM service types within the corresponding geographic region can be ordered according to a preference of the GSM service types within the corresponding geographic region. For example, GSM service type Band Class 1900 may be preferred over GSM service type Band Class 900. In this case, a PLMN field in the Extended System Table can indicate the preference. This preference may be used by the wireless communication device to acquire the service type for registration, or the ranking in the PLMN field may be checked against the Preferred PLMN list and the final selection decision can be taken from the Preferred PLMN list.

When the PLMN_INCL indicates no preference for order of selection of GSM service types, for example PLMN_INCL=0, the PLMN field need not be specified. At 508, when the wireless communication device detects that a GSM service type is the more preferred service type in a particular geographic region, and the corresponding PLMN_INCL=0, then the wireless communication device can select the GSM service provider system according to the Preferred PLMN list at 408.

Figure 6:
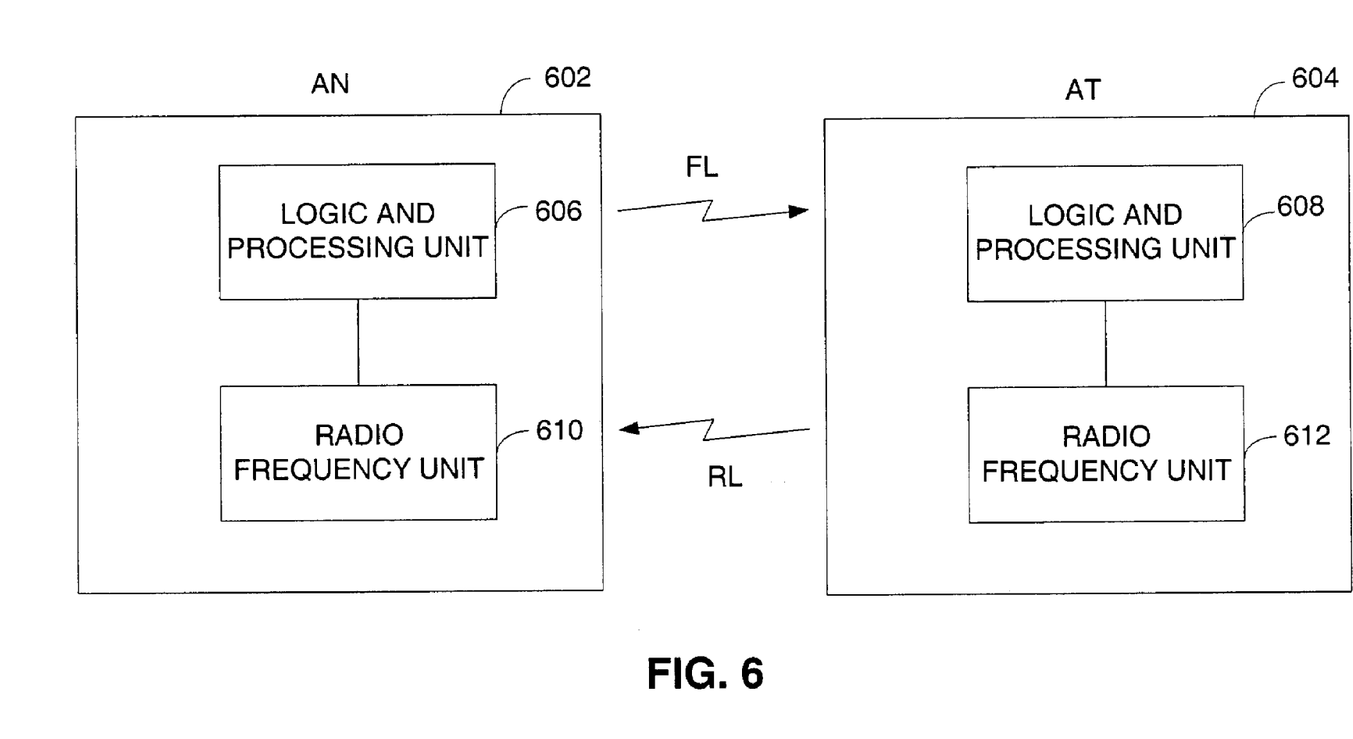
FIG. 6 illustrates a block diagram of two wireless communication devices in a wireless communication system.

FIG. 6 illustrates a block diagram of two wireless communication devices 602 and 604 in a wireless communication system. The communication devices, can be, for example a wireless telephone and a base station. Conventional hardware and software techniques can be employed by the wireless communication devices. Both wireless communication devices 602 and 604 can comprise a logic and processing units 606 and 608, respectively, and radio frequency units 610 and 612, respectively, for carrying out the above-described functionality. For example, one of ordinary skill in the art will appreciate that the radio frequency units can send and receive signals between the communication devices, and that the logic and processing units can perform the logical operations and processing of signals.

After the initial preferred service provider system is selected at 508, for example SID=0, the wireless communication device can attempt to acquire and register with the preferred service provider system.

The acquisition of the preferred service provider system could fail in an area of the geographic region because of a "dark spot" or lack of coverage by the preferred service provider system.

For example, CDMA-type service provider system having SID=0 may cover a subset of the first region described with reference to FIG. 3, whereas the GSM-type service provider system may cover the entire first region. Thus, if the wireless communication device is in an area of the first region not covered by the CDMA provider, the acquisition attempt will fail. Furthermore, after a short interval, the wireless communication device will again attempt to acquire the CDMA provider. This process will continue, causing a drain in the batteries of the wireless communication device.

It is possible to enhance the service provider system selection process by using positioning information. In the example mentioned above, if the wireless communication device cannot acquire the CDMA-type service provider system, the wireless communication device can detect its own position using a Global Position System (GPS) including a GPS receiver. Other techniques for determining position can be used, for example, base station identification information. If a wireless communication device has acquired another base station, then the wireless communication device has likely moved its position.

If the wireless communication device does not move more than a predetermine change-in-position threshold, the wireless communication device can decide not to repeat its attempts of acquisition of the CDMA-type service provider system. The repeated attempts may be likely to fail since the wireless communication device is at the same location Thus, battery life can be improved. Moreover, page miss rate can be improved as a typical reselection activity requires the wireless communication device to tune away from the current channel for some duration.

Although this technique has been described in reference to the Extended PRL, it will be appreciated that this technique can be applied to other service provider selection processes where a service provider system cannot be acquired in a timely manner.

Figure 7:
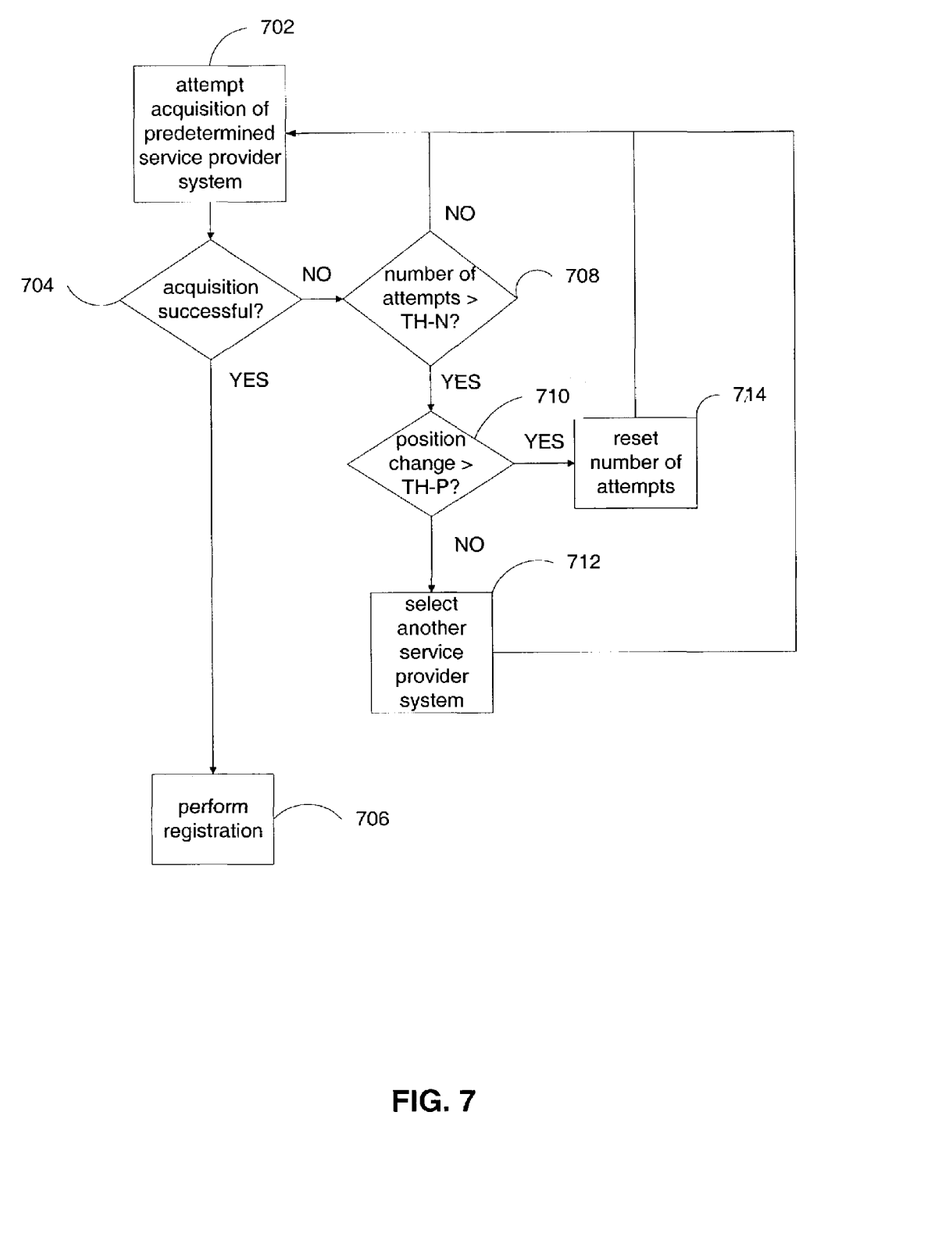
FIG. 7 illustrates a method of selecting a new service provider system for acquisition and registration.

FIG. 7 illustrates a method of selecting a new service provider system for acquisition and registration.

At 702, the wireless communication device attempts to acquire a predetermined service provider system of the plurality of service provider systems serving the geographic region. For example, initially the wireless communication device can attempt to acquire the most preferred provider with SID=0 in the first region as specified by the PRL, Extended PRL, or other ranking mechanism for the service providers of the geographic region.

At 704, the wireless communication device can determine if the acquisition of the predetermined service provider system is successful. When the acquisition of the predetermined provider system is successful, the wireless communication device can perform registration with the predetermined service provider system at 706.

When the acquisition of the predetermined provider system is not successful, the wireless communication device can determine if the number of attempts of acquisition of the predetermined service provider system exceeds a predetermined number-of-attempts threshold level TH-N at 708. The value of TH-N can be set so as to improve the battery life by avoiding unnecessary repeated attempts of a service provider that cannot be acquired.

When the number of attempts of acquisition of the predetermined service provider system does not exceed the TH-N, the wireless communication device can proceed to reattempt acquisition of the predetermined service provider system at 702.

When the acquisition of the predetermined service provider system is not successful and, optionally, the number of attempts exceeds TH-N, the wireless communication device can proceed to determine if the wireless communication device has changed its geographic position more than a predetermined change-in-position threshold TH-P at 710. TH-P can be set at a value to account for the lack of coverage by service providers in a region or non-overlapping areas of coverage by the service providers of the geographic regions, among other things. The TH-P value can be set in non-volatile memory of the wireless communication device. The TH-P can also be included in the roaming list. One or more TH-Ps may be associated with a region.

When the wireless communication device has not changed its geographic position more than TH-P, the wireless communication device can select another provider system of the plurality of service provider systems as the predetermined provider system at 712. The another provider system can be selected from the service provider ranking mechanism. For example, if the CDMA-type service provider system of the first region is not acquired after a number of attempts and the position of the wireless communication device has not changed, the wireless communication device can select the GSM-type service provider system in the first region, and then attempt to acquire the GSM-type service provider system.

When the wireless communication device has changed its geographic position more than TH-P, the wireless communication device can reset the number of attempts of acquisition of the predetermined provider system to a predetermined value, such as zero, at 714, and proceed to repeat attempting acquisition of the predetermined provider system at 714. Because the wireless communication device has changed its position more than TH-P, it is likely that the wireless communication device has moved to an area covered by the predetermined service provider system.

The method, apparatus, and system for selecting a service provider system described above can advantageously be utilized by a service provider that has deployed both CDMA and GSM service types and wants to let users with multi-mode phones use CDMA or GSM.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method selecting a new service provider system of a plurality of service provider systems serving a geographic region by a mobile wireless communication device (MWCD), the method comprising:

attempting acquisition of a predetermined service provider system of the plurality of service provider systems;

determining if the acquisition of the predetermined service provider system is successful;

determining if the MWCD has changed its geographic position more than a predetermined change-in-position threshold in response to the acquisition of the predetermined service provider system being unsuccessful; and selecting another service provider system of the plurality of service provider systems as the predetermined service provider system in response to the MWCD not changing its geographic position more than a predetermined change-in-position threshold.

2. The method of claim 1, wherein the predetermined provider system is selected from a Preferred Roaming List.

3. The method of claim 1, wherein the another provider system is selected from a Preferred Roaming List.

4. The method of claim 1 further comprising:

determining if the number of attempts of acquisition of the predetermined service provider system exceeds a predetermined number-of-attempts threshold level in response to the acquisition of the predetermined service provider system being unsuccessful; and proceeding to the step of determining if the MWCD has changed its geographic position in response to the number of attempts of acquisition of the predetermined service provider system exceeding the predetermined number of attempts threshold level.

5. The method of claim 4 further comprising:

proceeding to the step of attempting acquisition of the predetermined service provider system of the plurality of service provider systems in response to the number of attempts of acquisition of the predetermined service provider system not exceeding the predetermined number of attempts threshold level.

6. The method of claim 1 further comprising;

proceeding to the step of attempting acquisition of the predetermined service provider system of the plurality of service provider systems in response to the MWCD changing its geographic position more than a predetermined change-in-position threshold level.

7. The method of claim 6 further comprising:

resetting the number of attempts of acquisition of the predetermined service provider system to a predetermined value in response to the MWCD changing its geographic position more than a predetermined change-in-position threshold level.

8. The method of claim 1 further comprising: performing registration with the predetermined service provider system in response to the acquisition of the predetermined service provider system being successful.

9. The method of claim 1, wherein determining if the MWCD has the change in geographic position is determined by way of a Global Positioning System.

10. A mobile wireless communication device (MWCD) comprising:
   a radio frequency unit configured to attempt acquisition of a predetermined service provider system of the plurality of service provider systems and to determine if the acquisition of the predetermine service provider system is successful; and
   a logic and processing unit configured to determine if the MWCD has changed its geographic position more than a predetermined change-in-position threshold in response to the acquisition of the predetermined service provider system being unsuccessful and to select another service provider system of the plurality of service provider systems as the predetermined service provider system in response to the MWCD not changing its geographic position more than a predetermined change-in-position threshold level.

11. An article of manufacture comprising:
   means for attempting acquisition of a predetermined service provider system of the plurality of service provider systems;
   means for determining if the acquisition of the predetermined service provider system is successful;
   means for determining if the article of manufacture has changed its geographic position more than a predetermined change-in-position threshold in response to the acquisition of the predetermined service provider system being unsuccessful; and
   means for selecting another service provider system of the plurality of service provider systems as the predetermined service provider system in response to the article of manufacture not chancing its geographic position more than a predetermined change-in-position threshold level.

* * * * *